(12) United States Patent
Cannella et al.

(10) Patent No.: US 7,940,030 B2
(45) Date of Patent: May 10, 2011

(54) DC-DC CONVERTER WITH CURRENT OVERLOAD PROTECTION CIRCUIT AND METHOD

(75) Inventors: Eliana Cannella, Mascalucia (IT); Filippo Marino, Tremestieri Etneo (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 461 days.

(21) Appl. No.: 12/181,477

(22) Filed: Jul. 29, 2008

(65) Prior Publication Data
US 2009/0034302 A1    Feb. 5, 2009

(30) Foreign Application Priority Data
Jul. 31, 2007   (IT) ................ TO2007A0567

(51) Int. Cl.
*G05F 1/652* (2006.01)
(52) U.S. Cl. ........ 323/222; 323/282; 700/300; 361/91.5
(58) Field of Classification Search ............... 323/222, 323/224, 271–273, 282–286, 280; 363/17, 363/18, 56.04, 56.05; 361/18, 90, 91.06, 361/93.2, 33
See application file for complete search history.

(56) References Cited

U.S. PATENT DOCUMENTS

| 5,414,341 | A  | * | 5/1995  | Brown ........................... 323/268 |
| 5,592,118 | A  | * | 1/1997  | Wilmot et al. ................. 327/440 |
| 5,596,465 | A  | * | 1/1997  | Honda et al. .................... 361/18 |
| 6,246,220 | B1 | * | 6/2001  | Isham et al. ................... 323/224 |
| 6,967,519 | B2 | * | 11/2005 | Nakayama et al. ........... 327/380 |
| 7,053,593 | B2 | * | 5/2006  | Bemat et al. .................. 323/272 |

* cited by examiner

*Primary Examiner* — Rajnikant B Patel
(74) *Attorney, Agent, or Firm* — Lisa K. Jorgenson; James H. Morris; Wolf, Greenfield & Sacks, P.C.

(57) ABSTRACT

A DC-DC converter including: a switch, having a control terminal receiving a control signal, and a conduction terminal supplying a current; a load, coupled to the conduction terminal of the switch and selectively receiving the current; a control circuit, receiving a clock signal and generating the control signal in synchronism with the clock signal; an over-current sensor, coupled to the switch so as to monitor an electrical quantity correlated to the current and to output a protection signal in presence of overcurrent; moreover including overcurrent-protection circuitry, receiving the protection signal and the clock signal and generating a disabling signal for the control circuit if delay between an overcurrent detection and the clock signal is shorter than a detection time.

21 Claims, 7 Drawing Sheets

DC-DC CONVERTER WITH CURRENT OVERLOAD PROTECTION CIRCUIT AND METHOD

BACKGROUND OF THE INVENTION

1. Field of the Invention

The present invention relates to a system for current overload protection in DC-DC converters and to the corresponding method.

2. Discussion of the Related Art

As is known, DC-DC converters are electronic components important for proper operation of electronic systems, which, being supplied, for example, by a common generator, require operative voltages that are different from one another. For example, DC-DC converters are used in cellphones, laptops, and in general in battery-supplied electronic systems.

Frequently, the subcircuits used in these electronic systems require operating voltages different from the one supplied by the battery, and typically lower. Consequently, DC-DC converters are commonly used and generate a voltage level different from the converter input voltage.

Figure 1A:
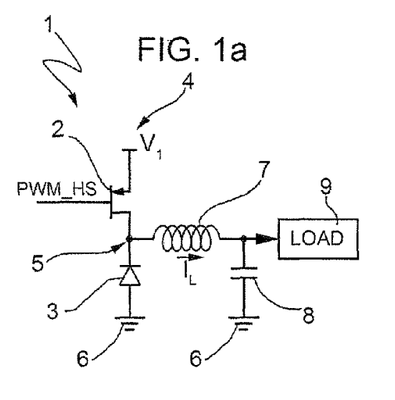
FIGS. 1a and 1b show two embodiments of a DC-DC converter of the known buck type.
Figure 1B:
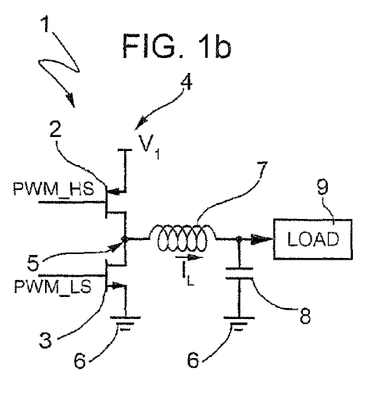

FIGS. 1a and 1b illustrate, as an example, two possible embodiments of a DC-DC converter 1 of a "buck converter" type without any protection circuit. However, this configuration should not be considered in any way limiting the reference application field, in so far as considerations similar to the following may apply to DC-DC converters of other types, for example flyback converters and boost converters.

With reference to FIGS. 1a, 1b, the DC-DC converter 1 comprises a first and a second switch 2, 3, typically formed by bipolar, N-channel or P-channel MOSFETs, or diodes.

In particular, FIG. 1a shows a DC-DC converter 1 with free-wheeling diode.

The first switch 2, in this example a MOS transistor, has a first terminal, which is connected to an input terminal 4 of the DC-DC converter 1 and receives a d.c. voltage V1, a second terminal connected to a node 5, and a control terminal receiving a voltage signal PWM_HS. The node 5 is connected to a ground terminal 6, through the second switch 3.

The second switch 3, in this example a diode, has a first terminal connected to the node 5 and a second terminal connected to the ground terminal 6. The node 5 is moreover electrically connected to an inductive element 7, a capacitive element 8, and a load 9.

In use, when the first switch 2 is on, it is flown by a current $I_L$, coming from the input terminal 4 and flows therefrom to the node 5 and then through the inductive element 7. In this condition, the diode 3 is reversely biased and does not conduct.

When the first switch 2 is turned off, the voltage across the inductive element 7 is reversed, thus directly biasing the diode 3, which sets the voltage drop on the load to the value of approximately 0 V.

FIG. 1b shows, instead, a DC-DC converter 1 of the buck-converter type with synchronous rectification.

In this case, the second switch 3 is obtained using a MOS transistor. Here, the second switch 3 has a control terminal receiving a control signal PWM_LS.

To ensure robustness of DC-DC converters during use, it is known to interface these converters with protection circuits having the function of preventing breakdown or damage to electrical components coupled at the output of the converter and to load elements, in faulty operating conditions. The systems known and used for protecting DC-DC converters from current overload and/or from short-circuits on the output enable limitation of the current supplied to the load by reducing the duty cycle or decreasing the on/off rate at which the DC-DC converter operates (J. Yang, "Analysis and evaluation of over current protection for DC to DC PWM converters," Power Electronics and Motion-Control Conference, 2004, and U.S. Pat. No. 6,218,820).

Figure 2:
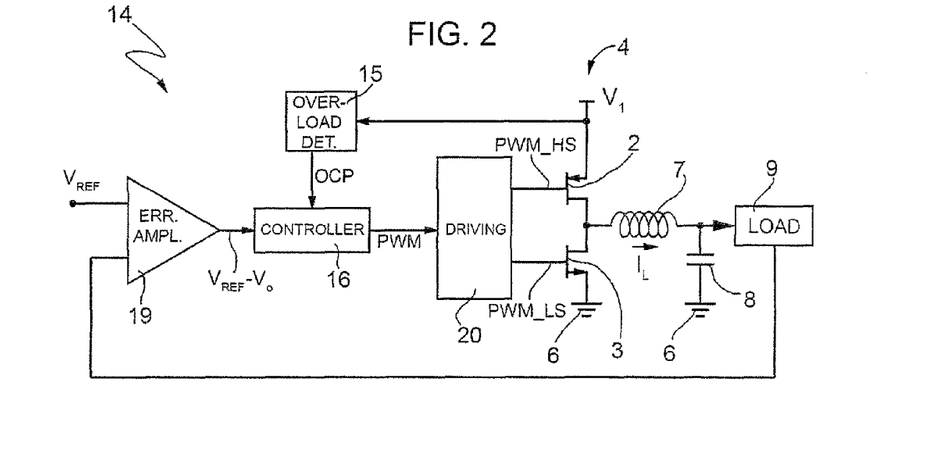
FIG. 2 shows a block diagram of a DC-DC converter coupled to a protection circuit.

FIG. 2 shows a first circuit 14 for overcurrent protection connected, for example, to the synchronous-rectification DC-DC converter 1 of the type illustrated in FIG. 1b.

An overcurrent detector 15 receives a signal correlated to the current $I_L$ flowing in the induction coil 7 during turning-on of the first switch 2 and outputs a threshold-overstepping signal OCP.

For example, the overcurrent detector 15 detects the voltage across a "sense" resistor (not illustrated), connected in series to the first switch 2, and comprises a threshold comparator, which compares the detected voltage with a reference value.

The threshold-overstepping signal OCP is then supplied to the input of a controller 16, which in turn, on the basis of the threshold-overstepping signal OCP, outputs a duty-cycle signal PWM.

The duty-cycle signal PWM is then supplied to the input a driving circuit 20, which controls opening or closing of the first switch 2 and of the second switch 3, respectively, through a first turning-on signal PWM_HS and a second turning-on signal PWM_LS. When the DC-DC converter 1 is of the free-wheeling diode-type as illustrated in FIG. 1a, the second turning-on signal PWM_LS is not necessary, and only the first turning-on signal PWM_HS is supplied to the first switch 2.

A feedback branch electrically connects the load 9 to an error amplifier 19, which receives on a first input an output signal $V_O$ coming from the load 9 and on a second input a reference signal $V_{REF}$. An error signal at the output of the error amplifier 19, given by the difference $V_{REF}-V_O$, is supplied to the controller 16.

If the overcurrent detector 15 does not intervene, the difference signal $V_{REF}-V_O$ is kept at approximately 0 V. In fact, when the load 9 varies, the voltage signal $V_O$ undergoes a variation of opposite sign, which is detected by the controller 16. This modifies the on/off time (i.e., the duty cycle) of the first switch 2, so as to bring the voltage signal $V_O$ back to the steady-state value.

The overcurrent detector 15 contributes to implementing a first overcurrent protection technique, which is commonly referred to as "peak-limitation technique" and can be used with both the free-wheeling diode configuration (FIG. 1a) and the synchronous rectification configuration (FIG. 1b) of the DC-DC converter 1. In particular, at each on/off cycle (timed by a clock signal), when the current that flows through the first switch 2 exceeds a maximum peak level (of a value that varies according to the tolerance required by the application), the first switch 2 is kept off until the end of the current clock cycle.

Figure 3:
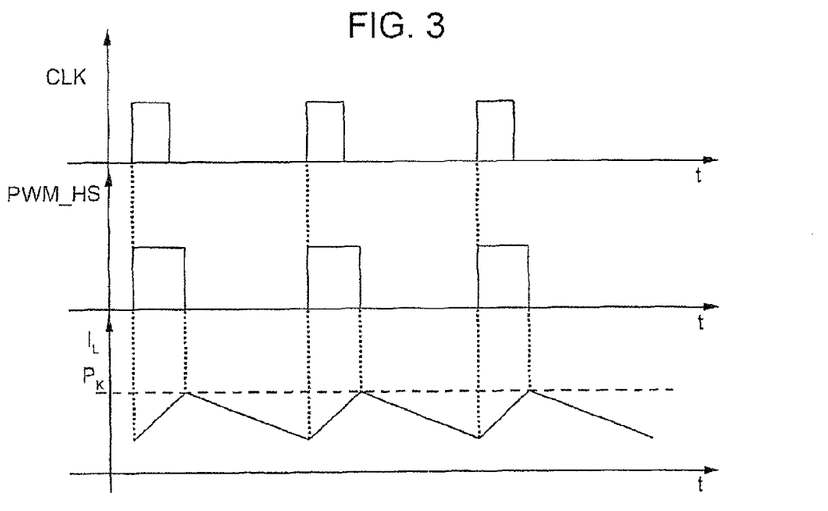
FIGS. 3 and 4 show waveforms of signals taken on the circuits of FIGS. 1a and/or 1b, in two different conditions of protection.

The waveforms obtainable with the protection technique described are, for example, represented in FIG. 3, which shows a clock signal CLK, the first turning-on signal PWM_HS and the current $I_L$ that flows through the inductive element 7.

In detail, at each transition from a low level to a high level of the clock signal CLK, the first turning-on signal PWM_HS also switches from low to high, turning on the first switch 2, which, in this step, supplies the current $I_L$. Consequently, the value of the current $I_L$ increases. In the presence of a possible overcurrent, the current $I_L$ reaches a protection threshold $P_k$. Exceeding the protection threshold $P_k$ is detected by the overcurrent detector 15, which switches and causes, through the controller 16 and the driving circuit 20, switching of the first turning-on signal PWM_HS to low. The first switch 2 is turned off and the second switch 3 is turned on, so causing a reduction in the current $I_L$.

Turning-on of the second switch 3 can be controlled by the signal PWM_LS if the synchronous rectification configuration of the DC-DC converter 1 is used (FIG. 1b), or else occurs automatically after turning off the first switch 2 if the free-wheeling diode configuration of converter (FIG. 1a) is used.

The peak protection technique illustrated above is not, however, sufficient to guarantee robustness of the DC-DC converter 1, in so far as, in the event of marked current overload, the average value of the current on the output of the DC-DC converter 1, and thus on the load 9, can be considerably high notwithstanding the use of the first protection circuit 14.

To overcome this problem, it is possible to implement a second overcurrent protection technique, referred to as "hiccup." The hiccup protection technique can be used in addition to the peak protection technique, and envisages the use of a protection threshold PH (not illustrated) higher than the protection threshold $P_k$. When the current at the output of the DC-DC converter 1 exceeds this protection threshold PH, the intervention of the hiccup protection causes complete switching-off of the DC-DC converter 1.

Figure 4:
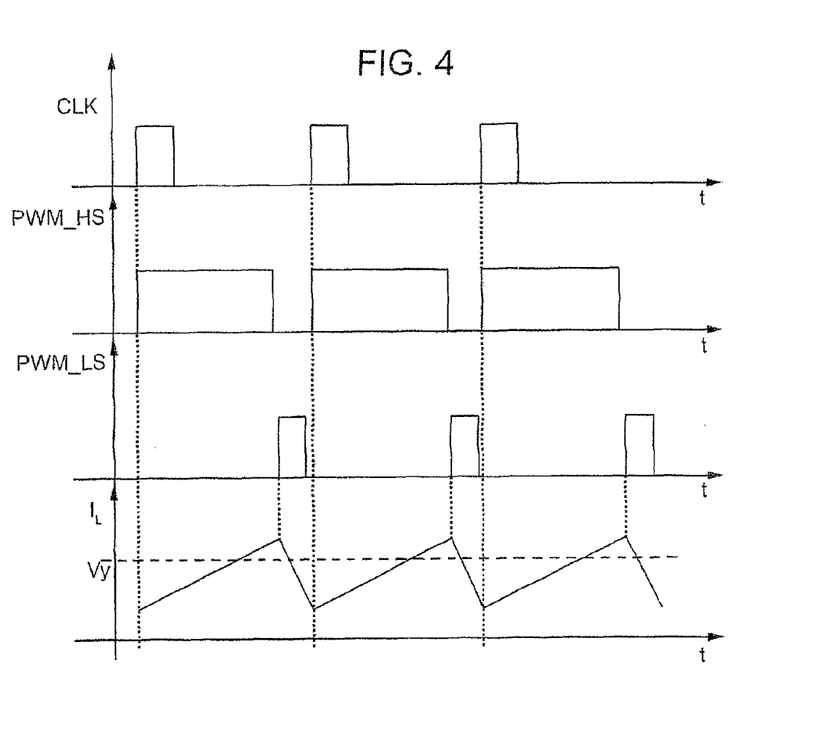

A third overcurrent protection technique, which can be used as an alternative to the peak protection technique, is referred to as "trough-limitation technique." As illustrated in FIG. 4, this technique envisages the use of a protection threshold $V_y$. Also in this case, at each transition from low to high of the clock signal CLK_21, the first turning-on signal PWM_HS switches from low to high, so turning on the first switch 2 and generating a consequent increase in the value of the current $I_L$. After a fixed time, defined by the duty cycle chosen for the first turning-on signal PWM_HS, the latter switches from high to low, and the second turning-on signal PWM_LS passes from low to high for a fixed duration, defined by the duty cycle chosen for the second turning-on signal PWM_LS. Consequently, the value of the current $I_L$ starts decreasing. If, at the start of the subsequent clock cycle, the current $I_L$ has a lower value than the value $V_y$ of the protection threshold, then the first turning-on signal PWM_HS switches again from low to high. If, instead, at the start of this cycle, the current $I_L$ is higher than the protection threshold $V_y$, the first turning-on signal PWM_HS remains low, and the second turning-on signal PWM_LS remains high for the entire duration of the considered clock cycle.

The hiccup protection technique can be associated also to the trough-limitation technique, as further protection of the DC-DC converter 1.

To sum up, the peak-limitation technique reduces the duty cycle of the first turning-on signal PWM_HS and maintains fixed the on/off rate of the first and second switches 2, 3; the trough-limitation technique maintains fixed the duty cycle of the first turning-on signal PWM_HS and decreases the on/off rate of the first and second switches 2, 3.

It is evident that the trough-limitation technique cannot be used with DC-DC converters in free-wheeling diode configuration (FIG. 1a).

Furthermore, the output voltage $V_O$ is out of regulation during opening of the switch 2.

Consequently, when the trough-limitation technique is used, it may happen that the switch 2 remains open on account of intervention of the protection and that this causes decrease in the output voltage.

When the current that flows through the second switch 3 drops below the trough value, the first switch 2 is closed (after opening of the second switch 3) and this could remain closed for an entire clock cycle (100% of the duty cycle) in order to try to recover the decrease in the output voltage. Since no control is present on the current that traverses the first switch 2, this could increase excessively during this time generating malfunctioning on the load 9, even up to breakdown of the latter.

Neither the peak-limitation technique nor the trough-limitation technique, if used individually, is consequently able to guarantee a sufficient robustness of the converter to which it is applied.

The simultaneous use of the two techniques described and the provision of the circuitry necessary for their implementation would introduce a high circuit complexity, linked to the need for two distinct protection circuits 14 operating on the first and second switches 2, 3. This solution is consequently markedly disadvantageous and complex to implement.

SUMMARY OF THE INVENTION

One aim of the present invention is hence to overcome at least some of the disadvantages of the known circuits.

According to one embodiment of the present invention there is provided a circuit for current overload protection in DC-DC converters comprising a DC-DC converter comprising: a switch, having a control terminal receiving a control signal, and a conduction terminal supplying a current; a load, coupled to the conduction terminal of said switch and selectively receiving said current; a control circuit, receiving a clock signal and generating said control signal in synchronism with said clock signal; an overcurrent sensor, coupled to said switch so as to monitor an electrical quantity correlated to said current and to output a protection signal in presence of overcurrent; and overcurrent-protection means receiving said protection signal and said clock signal, and generating a disabling signal for said control circuit in case of overcurrent detection with a delay, with respect to said clock signal, shorter than a detection time.

According to another embodiment of the present invention, there is provided a method for protecting a DC-DC converter comprising a switch controlled by a control signal and flown by a current; the method comprising: receiving a clock signal and generating said control signal in synchronism with said clock signal; monitoring an electrical quantity correlated to said current; generating a protection signal (OCP) in presence of overcurrent; and generating a disabling signal for said control circuit if a delay between an overcurrent detection and said clock signal is shorter than a detection time.

BRIEF DESCRIPTION OF THE DRAWINGS

For a better understanding of the present invention, a preferred embodiment thereof is now described, purely by way of non-limiting example and with reference to the attached drawings, wherein.

DETAILED DESCRIPTION

Figure 5:
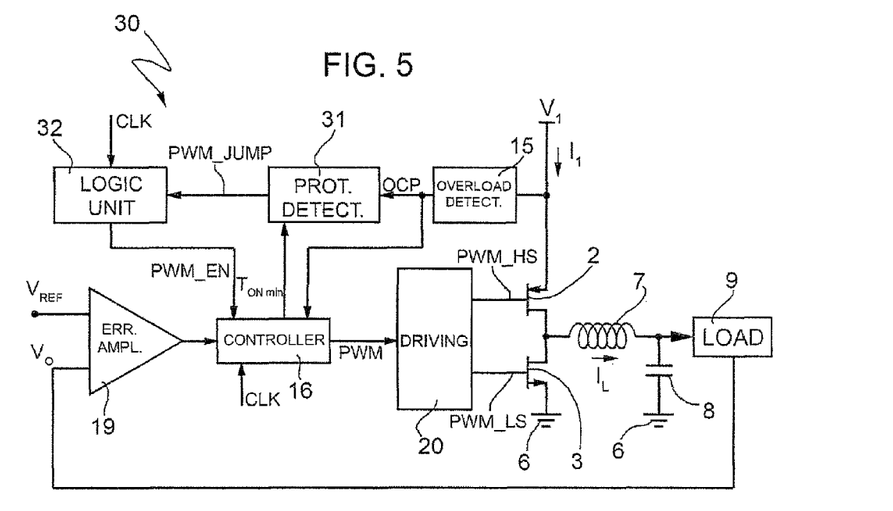
FIG. 5 shows a block diagram of a DC-DC converter including a circuit for overcurrent protection.

FIG. 5 illustrates a block diagram of a DC-DC converter 30 including a circuit for current overload protection according to an embodiment of the invention.

The DC-DC converter 30 comprises a voltage-control loop similar to FIG. 1 and comprising the error amplifier 19, the controller 16 and the driving circuit 20, similar to the corresponding elements of FIG. 2 and thus not described in detail. Furthermore, the DC-DC converter 30 comprises a protection-intervention detector 31 and a logic unit 32.

In detail, the protection-intervention detector 31 receives, on a first input, the threshold-overstepping signal OCP, coming from the overcurrent detector 15 and indicating that a protection threshold has been exceeded by the current that flows through the first switch 2 and is, at this stage, equal to the current $I_L$. The protection-intervention detector 31 moreover receives, on a second input, a time signal $T_{ONmin}$, coming from the controller 16 and defining an time $T_M$ before which the present protection technique is activated. The protection-intervention detector 31 outputs a jump signal PWM_JUMP, which indicates the possible need for a protection intervention. The jump signal PWM_JUMP is then supplied at the input of the logic unit 32, which in turn outputs a duty-cycle enable signal PWM_EN in synchronism with the clock signal CLK and used for enabling or disabling turning-on of the first switch 2. The duty-cycle enable signal PWM_EN is inputted to the controller 16, which causes, through the driving circuit 20, turning-on and turning-off of the first and second switches 2, 3, and also operates synchronously with the clock signal CLK.

In use, the current $I_L$ that flows through the first switch 2 is monitored continuously. If the overcurrent detector 15 detects the current $I_L$ exceeding the protection threshold after the time interval $T_M$, the circuit operates according to the peak-detection technique described above, turning off the first switch 2 and causing turning-on of the second switch 3. Instead, if the current $I_L$ exceeds the preset protection threshold before the time $T_M$, due to a marked overload, the protection circuit intervenes, keeping the first switch 2 off also in the subsequent cycles, as described hereinafter.

In detail, when the current $I_L$ exceeds the preset protection threshold, the threshold-overstepping signal OCP switches, and the protection-intervention detector 31 checks whether switching has occurred before or after the time $T_M$. If it has occurred after this time, as indicated, the jump signal PWM_JUMP does not switch, and the controller 16 reduces the duty-cycle of the DC-DC converter 30, turning off the first switch 2 and turning on the second switch 3.

If, instead, switching of the threshold-overstepping signal OCP occurs before $T_M$, the jump signal PWM_JUMP switches. This switching is detected by the logic unit 32, which calculates the number of subsequent cycles in which the first switch 2 is kept off. For example, this number can increase at each successive overstepping of the protection threshold and decrease gradually as soon as the current no longer exceeds the protection threshold. In particular, as long as the first switch 2 is to be kept off, the logic unit 32 generates a first preset level of the duty-cycle enable signal PWM_EN, for example a low level. This first level of the duty-cycle enable signal PWM_EN causes the controller 16 to keep the first switch 2 off and the second switch 3 on.

After the provided succession of cycles in protection conditions, the logic unit 32 causes switching of the duty-cycle enable signal PWM_EN to a second level, for example a high level, enabling turning-on of the first switch 2 in the subsequent clock cycle and consequent monitoring of the current, as described in detail hereinafter with reference to the flowchart of FIG. 7.

Figure 6:
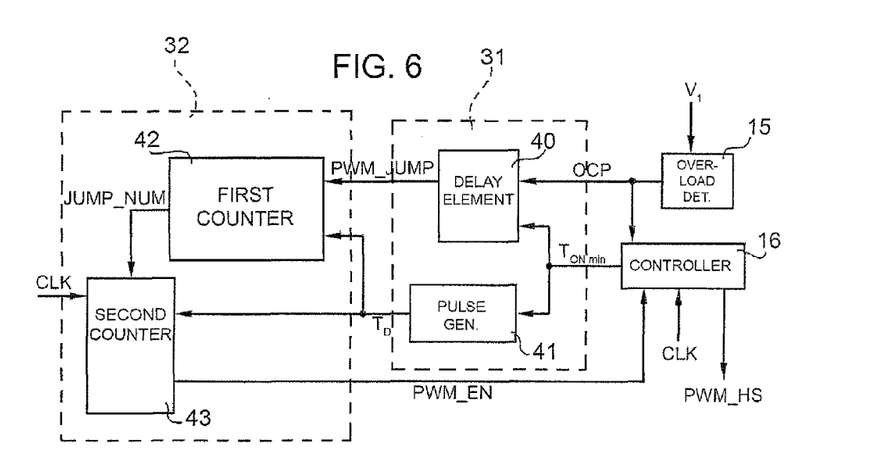
FIG. 6 shows a block diagram of a portion of the converter of FIG. 5.

FIG. 6 shows a block diagram of an embodiment of the structure of the protection-intervention detector 31 and of the logic unit 32.

In FIG. 6, the protection-intervention detector 31 comprises a delay element 40, for example a D-type flip-flop, and a pulse generator 41. The delay element 40 receives on a first input the threshold-overstepping signal OCP supplied by the overcurrent detector 15 and on a second input the time signal $T_{ONmin}$ supplied by the controller 16 and outputs the jump signal PWM_JUMP. The time signal $T_{ONmin}$ is a signal synchronous with the clock signal CLK but with a duration equal to $T_M$. Consequently, it enables the jump signal PWM_JUMP to switch from the inactive state (for example low) to the active state (for example high) upon switching of the threshold-overstepping signal OCP only if this switching occurs before the time $T_M$.

The pulse generator 41 receives on an input the time signal $T_{ONmin}$ supplied by the controller 16 and outputs an impulsive signal $T_D$, having the function of delaying, for example by approximately 10 ns, the operations performed by the logic unit 32 in order to enable the signals at the input of the logic unit 32 to reach a stable signal level.

The logic unit 32 comprises a first counter 42 and a second counter 43. The first counter 42 receives on a first input the jump signal PWM_JUMP, on a second input the impulsive signal $T_D$, and supplies to the second counter 43 a jump number signal JUMP_NUM; the second counter 43 receives moreover the impulsive signal $T_D$ and the clock signal CLK, and outputs the duty-cycle enable signal PWM_EN. In practice, the first counter 42 sets the number of successive cycles in which the first switch 2 is not turned on and the second counter 43 keeps the duty-cycle enable signal PWM_EN in the disabled state for the number of cycles indicated by the jump number signal JUMP_NUM.

Figure 7:
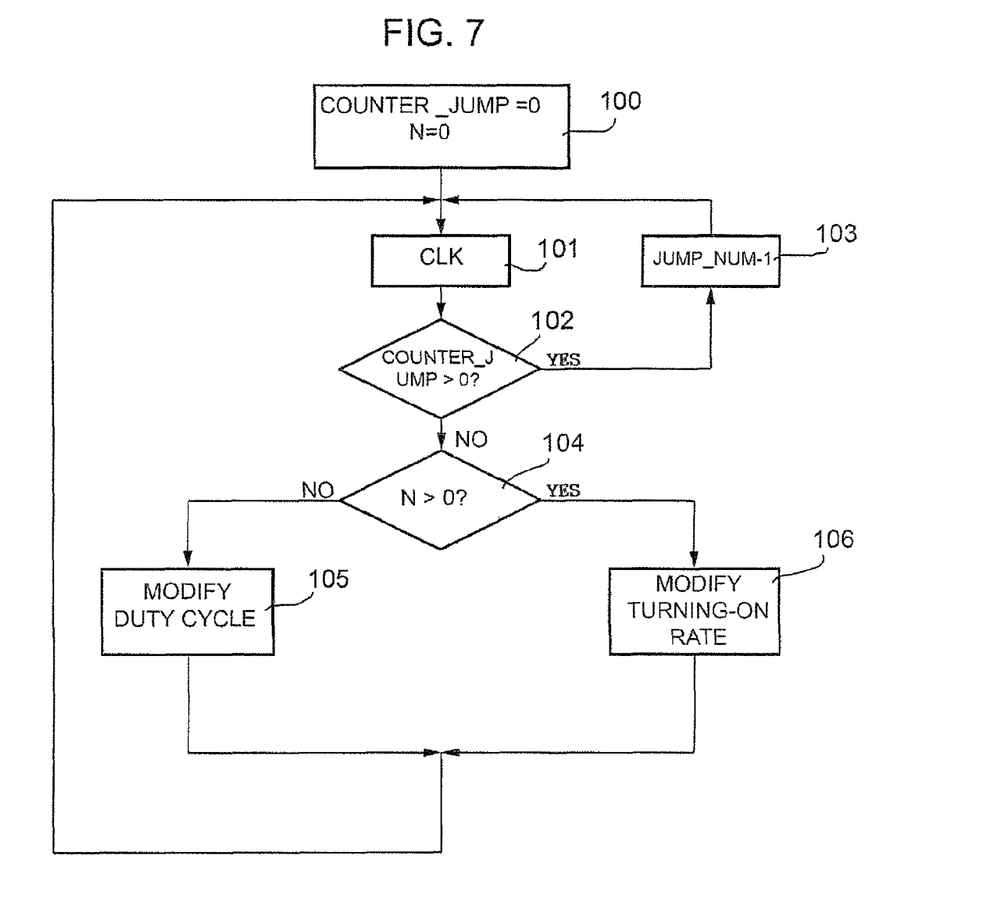
FIGS. 7-9 show a flowchart of the method implemented by the present protection circuit.
Figure 8:
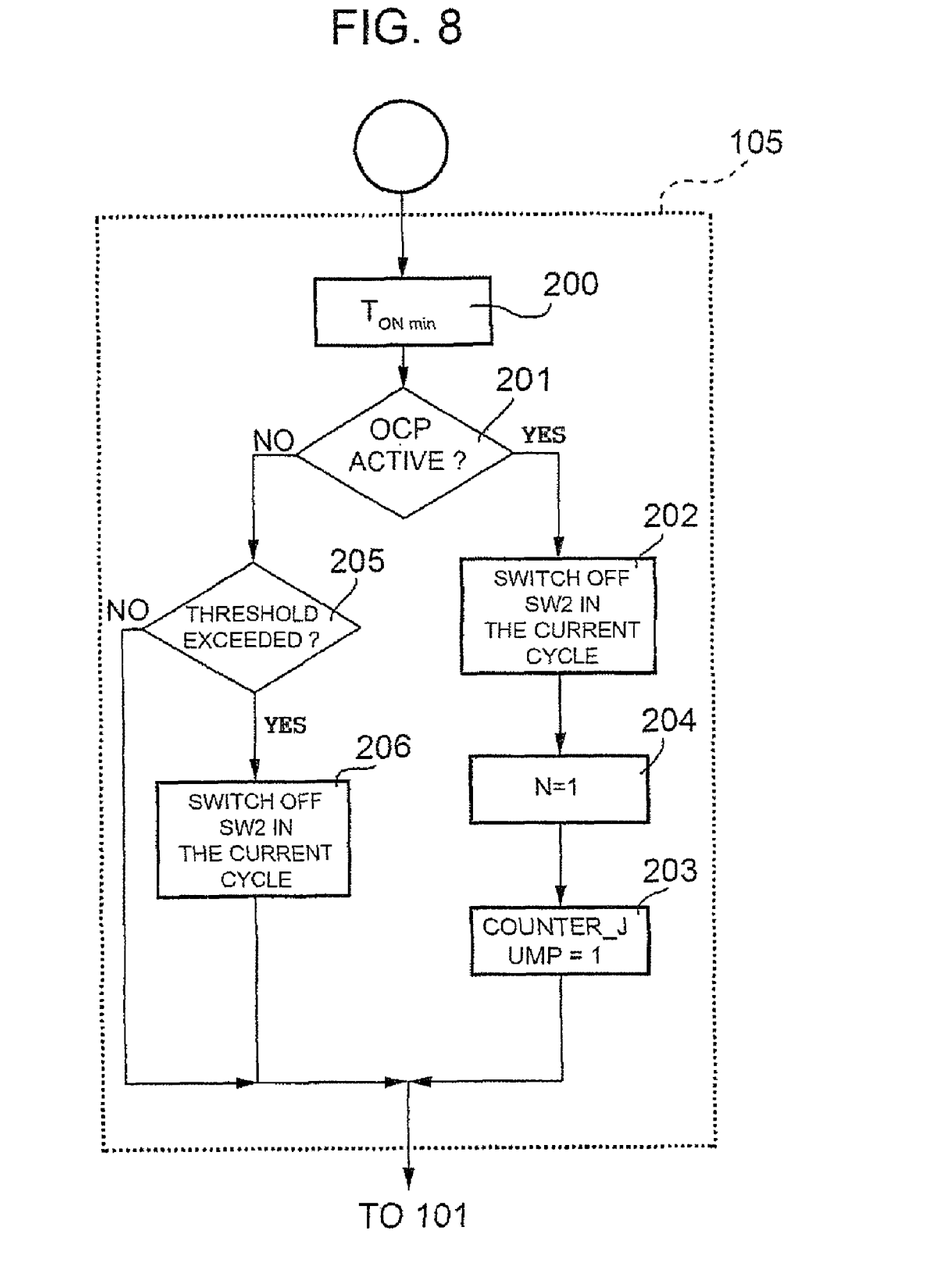
Figure 9:
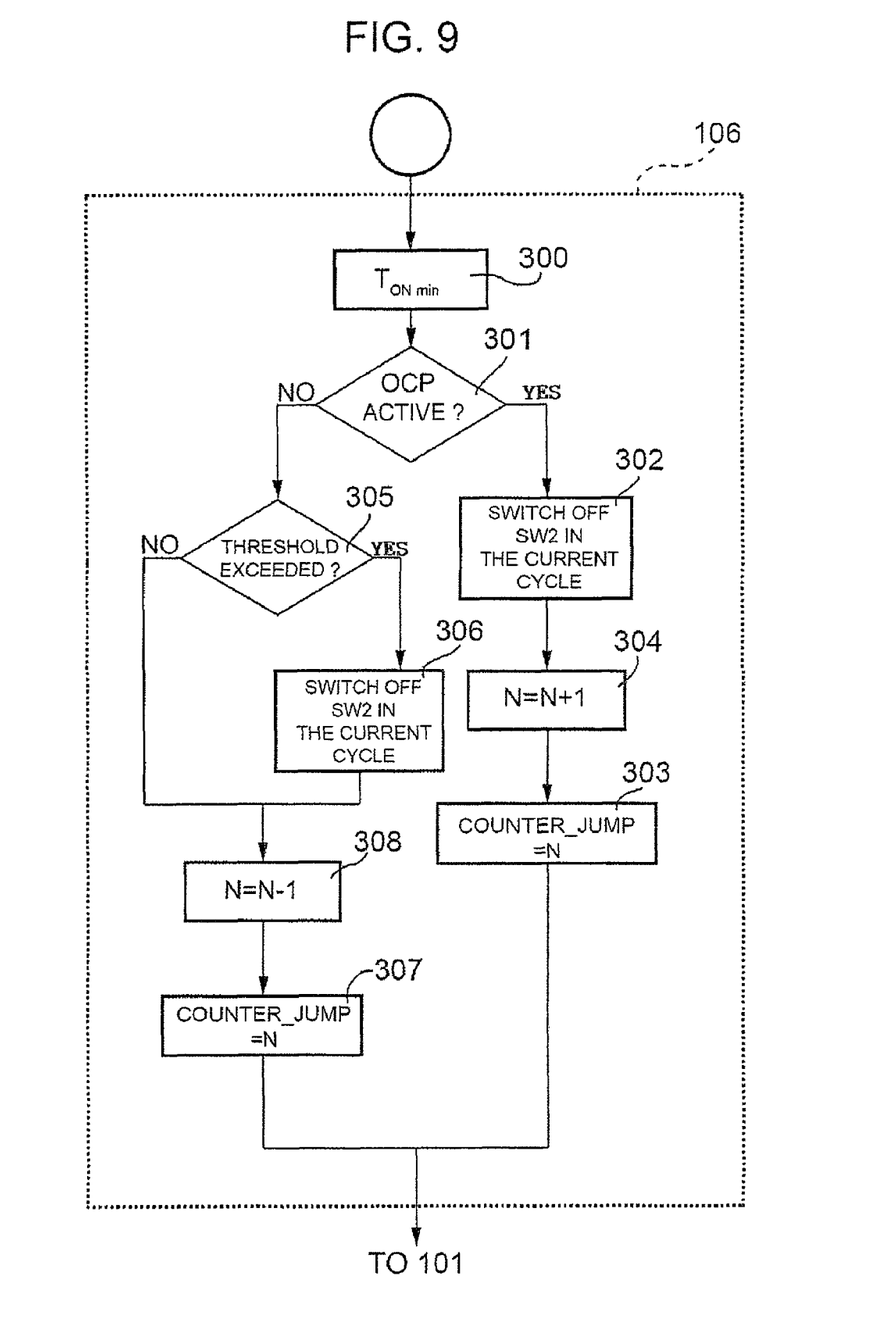

FIGS. 7-9 illustrate a flowchart showing a possible implementation of the operation method of the DC-DC converter 30 of FIG. 5.

In detail, FIG. 7 (step 100), a variable COUNTER_JUMP and a variable N are initialized at a value equal to zero. The variable COUNTER_JUMP defines the number of clock cycles in which, if the second protection circuit 30 is in the protection state, the first switch 2 is kept off, and the variable N defines the number of clock cycles, preceding the current clock cycle, during which the first switch 2 has been kept off.

Then (step 101), an active edge of the clock signal CLK is detected.

Next (step 102), it is verified whether the variable COUNTER_JUMP has assumed a value higher than zero. In this case, the first switch 2 is kept off for a number of clock cycles CLK equal to the value assumed by this variable. If the variable COUNTER_JUMP assumes a value higher than zero (output YES, step 102), this variable is decremented by a unit (step 103) and start of a new clock cycle is waited; if, instead, the value assumed by the variable COUNTER_JUMP is equal to zero (output NO, step 102) it is verified (step 104) whether the first switch 2 has remained off for one or more clock cycles prior to the current clock cycle. In this case, the variable N assumes a value higher than zero. If the value assumed by the variable N is higher than zero (output YES) the procedure for modifying the turning-on rate of the first switch 2 is activated (step 106, FIG. 9); otherwise (output NO) the procedure for modifying the duty-cycle is activated (step 105, FIG. 8).

FIG. 8 shows in detail the step 105. Initially, the protection-intervention detector 31 waits for time $T_M$ (step 200), after which the value of the threshold-overstepping signal OCP (step 201) is detected.

If the current $I_L$ has exceeded the protection threshold (output YES from step 201), the first switch 2 is turned off for the current clock cycle (step 202), the value of the variable COUNTER_JUMP is set to one (step 203), in order to signal that the subsequent on-cycle of the first switch 2 is to be avoided, and the value of the variable N is set to one (step 204). Then the start of the subsequent clock cycle is waited.

In case of output NO from step 201, the first switch 2 is kept on, and (step 205) it is checked whether the current $I_L$ exceeds the protection threshold during the time comprised between the time $T_M$ and the end of the current clock cycle.

If the protection threshold is exceeded (output YES from step 205), the first switch 2 is turned off for the rest of the current clock cycle and the subsequent clock cycle is waited, when the first switch 2 is again turned on; if, instead, the protection threshold is not exceeded (output NO from step 205), the next clock cycle is waited, and the DC-DC converter 30 is subjected only to the voltage regulation carried out by the components 19, 16, 20.

FIG. 9 shows, in detail, step 106. Initially, the protection-intervention detector 31 waits for the time $T_M$ (step 300), then, the value of the threshold-overstepping signal OCP is detected (step 301).

If the current $I_L$ exceeds the preset protection threshold (threshold-overstepping signal OCP active, output YES from step 301), the first switch 2 is turned off for the residual duration of the current clock cycle (step 302), and the variable COUNTER_JUMP is set at N+1 (step 303) as is the variable N (step 304). Then, in the next N+1 clock cycles, the first switch 2 is kept off. In this way, the on/off rate is reduced.

If, instead, the protection threshold is not exceeded by the time $T_M$ (output NO from step 301), it is checked whether the current $I_L$ exceeds the preset protection threshold during the time interval following upon instant $T_M$. In this case (output YES from step 305), the first switch 2 is turned off for the residual duration of the current clock cycle, thus reducing the duty cycle. In either case, subsequently, the variable COUNTER_JUMP is decremented and set to N−1 (step 307) as likewise the variable N (step 308), generating an increase in the on/off rate of the first switch 2.

In practice, if before the instant $T_M$ no current overload occurs, it is assumed that the critical condition has ceased and the on/off rate is increased once again, at the same time decrementing by one unit the variable N.

This method enables simultaneous limitation of the duty cycle of the signal that governs turning-on of the first switch 2 and the on/off rate of the first and second switches 2, 3, enabling the system to adapt to the overload present.

In the limit condition, in the event of marked current overload, the DC-DC converter 30 functions with minimum duty cycle of the first turning-on signal PWM_HS and minimum on/off rate of the first and second switches 2, 3.

A particular operation example of the DC-DC converter 30 is described hereinafter.

Assume, for example, a marked overload during the first clock cycle and assume that the current $I_L$ that flows through the first switch 2 exceeds the protection threshold after the instant $T_M$. In this case, the first switch 2 is turned off for the rest of the first clock cycle.

In the next clock cycle (second cycle), the first switch 2 is again on; if the current $I_L$ exceeds the protection threshold before the instant $T_M$, the first switch 2 is turned off for the rest of the clock cycle (second cycle) and for the subsequent clock cycle (third cycle). In this way, one turning-on cycle is skipped.

In the fourth clock cycle, the first switch 2 is again on and, if the current $I_L$ exceeds the protection threshold before the instant $T_M$, the first switch 2 is turned off for the rest of the clock cycle (fourth cycle) and for the two subsequent clock cycles (fifth clock cycle and sixth clock cycle).

In the seventh clock cycle, the first switch 2 is again on, and if the current $I_L$ exceeds the protection threshold before the instant $T_M$, the first switch 2 is turned off for the rest of the clock cycle (seventh cycle) and for the three subsequent clock cycles (eighth, ninth, tenth cycles).

The method can provide for a maximum number of clock cycles to be skipped, for example 7 clock cycles, and when this number is reached, the DC-DC converter 30 functions at a fixed rate, which is a submultiple of the operating rate in the absence of protection intervention.

If the condition of marked overload is no longer present, the current $I_L$ flowing through the first switch 2 remains lower than the value of the protection threshold before the instant $T_M$. When this occurs, the number of clock cycles wherein turning-on of the first switch 2 is skipped starts to be decremented.

Then, if, for example, in the eleventh clock cycle, the first switch 2 is on and the current $I_L$ does not exceed the protection-threshold level by the instant $T_M$, the first switch 2 is turned off only for the two next clock cycles (the twelfth and the thirteenth).

In the fourteenth clock cycle, the first switch 2 is again on and, if the current $I_L$ does not exceed the maximum level before the instant $T_M$, the first switch 2 is turned off only for the subsequent clock cycle, after which, assuming absence of intervention of the protection (i.e., the current $I_L$ remains lower than the protection threshold at least up to the instant $T_M$), the first switch 2 is turned on at each clock cycle.

In practice, the protection acts initially by varying the duty cycle for protecting the converter 30 from overloads (switching off the first switch 2 for the current clock cycle in the presence of overloads) but, if this is not sufficient to bring the system back again into a condition of stable supply of the current to the load 9, the switching rate of the first switch 2 is progressively reduced so that the DC-DC converter 30 operates at a rate that is a submultiple of the rate that it has in the absence of intervention of the protection.

The DC-DC converter 30 is moreover able to adapt to the type of overload that occurs. In detail, if there is a slight overload, a few on/off cycles of the first switch 2 are skipped so that the average value of the current supplied to the load 9 drops; instead, in case of marked overload, a number of successive on/off cycles are skipped.

Figure 10:
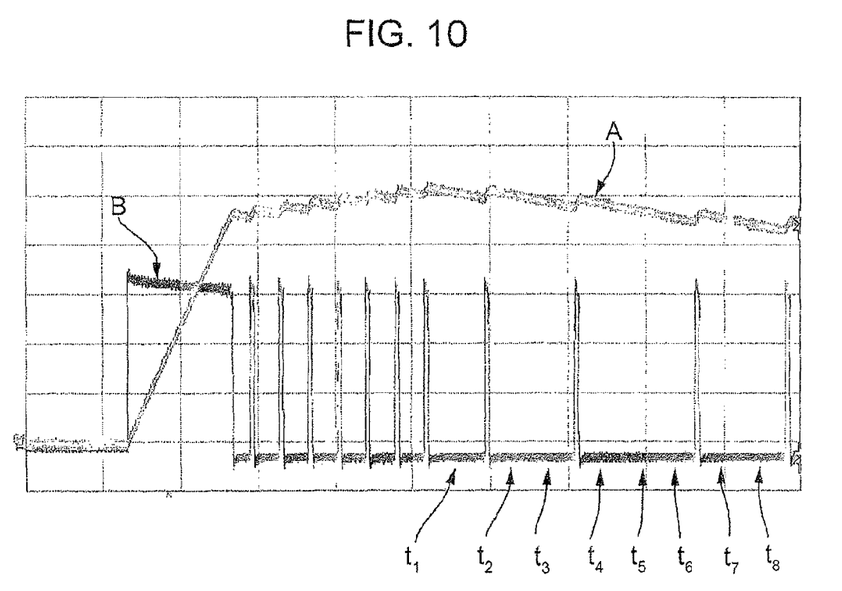
FIG. 10 shows waveforms of signals taken on the circuit of FIG. 5.

FIG. 10 shows an example of waveforms that can be obtained with the protection technique according to the present invention. The waveform A represents the evolution versus time of the current $I_L$, while the waveform B represents the evolution vs. time of the voltage on the node 5 of the DC-DC converter 30. In particular, when the first switch 2 is closed, the waveform B has the same evolution as the voltage V1 but for the voltage drop on the first switch 2, while when the first switch 2 is open and the second switch 3 is closed, the node 5 is grounded.

Initially (FIG. 10), the first switch 2 is on for a long period of time (the waveform B remains at a high value for the duration of this period), and this causes an increase in the current $I_L$. In the subsequent cycles, the first switch 2 is switched on for a shorter time, but at each cycle. At a certain time (designated by t1), first one on-cycle is skipped, then two (designated by t2, t3), subsequently three (designated by t4, t5, t6) and then again two (designated by t7, t8). This, because the first on-cycle has brought the current $I_L$ to values very close to the peak value so that initially the protection intervenes, decreasing the duty cycle. Since this is not sufficient to reduce the average value of the current $I_L$, subsequently it exceeds the peak value by the instant $T_M$. The second switch 2 is then controlled so as to skip consecutive on cycles in an increasing way, until the average value of the current $I_L$ is brought back again to a value lower than the peak value.

This flexibility enables a DC-DC converter 30 that is highly efficient, robust and with reduced circuit complexity to be obtained.

Finally, it is clear that modifications and variations can be made to the converter and to the method described and illustrated herein without thereby departing from the scope of the present invention, as defined by the annexed claims. In particular, the technique described can be used with both of the configurations of DC-DC converter 30, with free-wheeling diode (as illustrated in FIG. 1a) and with synchronous rectification, in so far as it is not necessary to monitor the current that flows through the second switch 3.

Furthermore, the instant $T_M$ can be fixed and stored, for example, in the protection-intervention detector 31. Alternatively, this instant can be variable and/or set by the user at setting of the DC-DC converter 30.

What is claimed is:

1. A DC-DC converter comprising:
    a switch, having a control terminal receiving a control signal, and a conduction terminal supplying a current;
    a load, coupled to the conduction terminal of said switch and selectively receiving said current;
    a control circuit, receiving a clock signal and generating said control signal in synchronism with said clock signal;
    an overcurrent sensor, coupled to said switch so as to monitor an electrical quantity correlated to said current and to output a protection signal in presence of overcurrent; and
    overcurrent-protection means receiving said protection signal and said clock signal, and generating a disabling signal for said control circuit in case of overcurrent detection with a delay, with respect to said clock signal, shorter than a detection time.

2. The DC-DC converter according to claim 1, wherein said overcurrent-protection means detects an overcurrent lasting condition in subsequent clock cycles and generate an off-cycles signal correlated to said overcurrent-lasting condition.

3. The DC-DC converter according to claim 1, wherein said overcurrent-protection means comprises:
    a protection-intervention detector receiving said protection signal and generating a first counting signal upon detection of said protection signal switching within said detection time; and
    a logic unit receiving said first counting signal and generating said disabling signal for a time correlated to the overcurrent-lasting condition.

4. The DC-DC converter according to claim 3, wherein said logic unit comprises a memory storing a number of preceding switch-deactivation cycles and means for verifying previous deactivation, which activate, in presence of said protection signal, duty-cycle regulating means if said stored number is lower than a minimum value and activating rate-regulating means if said stored number is higher than or equal to said minimum value, said -cycle regulating means increasing said stored number, and said rate-regulating means generating said disabling signal for a number of cycles of said clock signal correlated to said stored number.

5. The DC-DC converter according to claim 3, wherein said overcurrent-protection means activates, in absence of said protection signal within said detection time and if said stored number is higher than or equal to said minimum value, means for decrementing said stored number.

6. The DC-DC converter according to claim 3, wherein said protection-intervention detector comprises a delay element receiving a time signal correlated to said detection time and said protection signal, and outputting a jump signal supplied to said logic unit.

7. The DC-DC converter according to claim 6, wherein said logic unit comprises a first and a second counter element, said first counter element receiving said first counting signal and generating a second counting signal, correlated to an off-cycle number of said switch, and said second counter element receiving said second counting signal and generating said disabling signal.

8. The DC-DC converter according to claim 6, wherein said control circuit further generates said time signal.

9. A method for protecting a DC-DC converter comprising a switch controlled by a control signal and flown by a current; the method comprising:
    receiving a clock signal and generating said control signal in synchronism with said clock signal;
    monitoring an electrical quantity correlated to said current;
    generating a protection signal (OCP) in presence of overcurrent; and
    generating a disabling signal for said control circuit if a delay between an overcurrent detection and said clock signal is shorter than a detection time.

10. The method according to claim 9, wherein generating a disabling signal comprises detecting an overcurrent-lasting condition in subsequent clock cycles and generating a off-cycle signal correlated to said overcurrent-lasting condition, the method further comprising repeatedly generating said disabling signal for a number of clock cycles correlated to the value of said off-cycle signal.

11. The method according to claim 9, wherein generating a protection signal comprises detecting said protection signal and generating a first counting signal upon detection of switching of said protection signal within said detection time; and generating a disabling signal comprises receiving said first counting signal and generating said disabling signal having a duration correlated to said overcurrent-lasting condition.

12. The method according to any of the claim 9, comprising:
    initializing a preceding switch-deactivation cycle number;
    verifying whether said preceding switch-deactivation cycle number is higher than or equal to a minimum value;
    upon receipt of said protection signal and if said verification step yields a negative result, activating a duty-cycle regulation, incrementing said preceding switch-deactivation cycle number, and storing said incremented number;
    upon receipt of said protection signal and if said verification step yields a positive result, activating a rate regulation, including generating said disabling signal for a number of cycles of said clock signal correlated to said stored number.

13. The method according to claim 12, wherein said rate regulation comprises monitoring successive clock cycles and, in absence of said protection signal within said detection time, decrementing said stored number.

14. A method for protecting a DC-DC converter comprising the steps of:
  a) storing a threshold-overstepping index;
  b) generating a clock-signal pulse comprising a plurality of clock cycles;
  c) turning on a switch of said DC-DC converter;
  d) detecting a current flowing in the switch;
  e) verifying whether said detected current exceeds a protection threshold within an observation time;
  f) if said detected current exceeds said protection threshold within said observation time:
    f1) turning off said switch;
    f2) incrementing said threshold-overstepping index; and
    f3) keeping said switch off for a number of clock cycles of said plurality correlated to the threshold-overstepping index;
  g) if said detected current exceeds said protection threshold beyond said observation time:
    g1) turning off said switch;
    g2) decreasing said threshold-overstepping index; and
    g3) keeping said switch off for a number of clock cycles of said plurality correlated to the threshold-overstepping index; and
  h) repeating steps b) to g).

15. The method according to claim 14, comprising, after said step a) and before said step b), the step of storing a minimum value for said threshold-overstepping index, and turning off said switch after said step f) and before said step g), if said detected current exceeds said protection threshold beyond said observation time and said threshold-overstepping index is equal to said minimum value defined for said threshold-overstepping index.

16. A DC-DC converter comprising a switch controlled by a control signal and flown by a current; the converter comprising:
  a means for receiving a clock signal and generating said control signal in synchronism with said clock signal;
  a means for monitoring an electrical quantity correlated to said current;
  a means for generating a protection signal (OCP) in presence of overcurrent; and
  a means for generating a disabling signal for said control circuit if a delay between an overcurrent detection and said clock signal is shorter than a detection time.

17. The DC-DC converter according to claim 16, wherein the means for generating a disabling signal detects an overcurrent-lasting condition in subsequent clock cycles and generates an off-cycle signal correlated to said overcurrent-lasting condition.

18. The DC-DC converter according to claim 16, wherein the means for generating a protection signal comprises detects said protection signal and generates a first counting signal upon detection of switching of said protection signal within said detection time and generates a disabling signal comprises receiving said first counting signal and generating said disabling signal having a duration correlated to said overcurrent-lasting condition.

19. A method for protecting a DC-DC converter comprising
  establishing a period timing cycle;
  continuously monitoring a current that flows through a first switch of the DC-DC converter;
  turning off the first switch and causing a turning on of a second switch when the current exceeds a protection threshold after a threshold time interval;
  maintaining the first switch off also in a subsequent cycle of the period timing cycle when the current exceeds the protection threshold before a passing of the threshold time interval.

20. The method of claim 19, wherein the DC-DC converter includes a free wheeling diode.

21. The method of claim 19, wherein the DC-DC converter includes a synchronous rectification and wherein causing the turning on of the second switch includes providing a control signal to the second switch.

* * * * *